3,453,251
REACTION PRODUCTS AND THEIR PRODUCTION
Edwin E. Royals, Pensacola, Fla., and William C. Doyle, Jr., Shawnee Mission, Kans., assignors to Tenneco Chemicals, Inc., a corporation of Delaware
No Drawing. Filed Dec. 20, 1965, Ser. No. 515,231
Int. Cl. C07d 1/18
U.S. Cl. 260—97.5         12 Claims

ABSTRACT OF THE DISCLOSURE

The present invention relates to monomeric esters and mono-ethers of allo-ocimene diepoxide and to the production of such esters and ethers. The esters are formed by reacting (chemically combining) the diepoxide with a monocarboxylic acid to produce monoesters containing carbonyl, hydroxyl and epoxy groups, or diesters containing two hydroxyl groups and two carbonyl groups, or a mixture of such esters. A large number of monocarboxylic acids, free of other epoxy reactive groups, may be used, for example, fatty acids, rosin acids and benzoic acids. The mono-ethers are formed by reacting (chemically combining) allo-ocimene diepoxide with an equal molal amount of a monohydric alcohol, for example, aliphatic alcohols, phenol and cyclohexanol.

---

The present invention relates to novel esters and ethers of allo-ocimene diepoxide and to their production.

It has been found that a monocarboxylic acid can be reacted with allo-ocimene diepoxide to produce monoesters containing hydroxyl, carbonyl, and epoxy groups and to produce diesters containing two hydroxyl and two carbonyl groups. It also has been found that monohydric alcohols can be reacted with allo-ocimene diepoxide to form mono-ether derivatives containing a hydroxy group, an epoxy group, and an alkoxy or similar group.

Allo-ocimene diepoxide having the formula

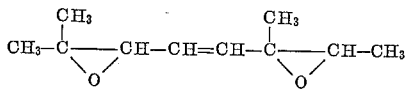

can be reacted with a saturated or unsaturated acid in a ratio of two moles of acid to one mole of diepoxide to form diesters having the general formula

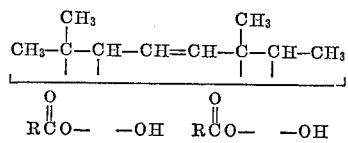

in which R is the residue of a monocarboxylic acid. The position of the substituent groups will depend upon which way the epoxy groups open. These diesters are 2,3,6,7-(diacyloxy, dihydroxy)-2,3-dimethyloctene-4 or 2,3,6,7-(diaryloxy, dihydroxy)-2,3-dimethyloctene-4, depending upon whether or not an aliphatic or armoatic acid is used. There are four possible isomers having this general formula and these isomers are represented by the following formulae wherein acetic acid is the reacting acid:

I.

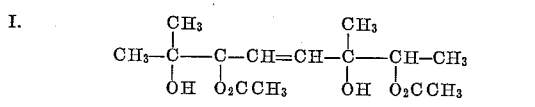

2,6-dihydroxy-3,7-diacetoxy-2,6-dimethyloctene-4

II.

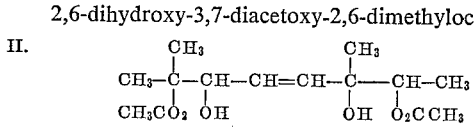

3,6-dihydroxy-2,7-diacetoxy-2,6-dimethyloctene-4

III.

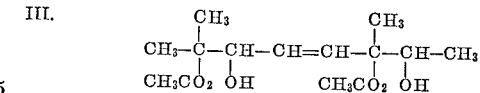

3,7-dihydroxy-2,6-diacetoxy-2,6-dimethyloctene-4

IV.

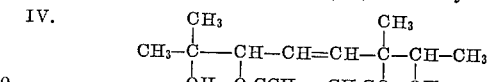

2,7-dihydroxy-3,6-diacetoxy-2,6-dimethyloctene-4

When allo-ocimene diepoxide is reacted with an equal molal amount of monocarboxylic acid there also are four possible isomers having the general formulae:

V.

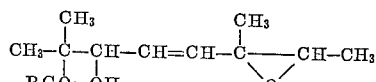

VI.

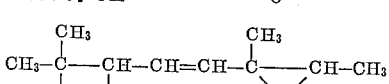

VII.

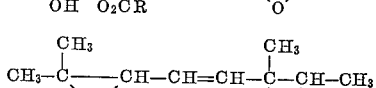

VIII.

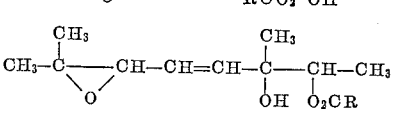

wherein R has the value previously stated. These isomers all fall within the term 2,3,6,7-(acyloxy epoxy hydroxy)-2,6-dimethyloctene-4 or 2,3,6,7-(aryloxy epoxy hydroxy)-2,6-dimethyloctene-4.

Any saturated or unsaturated monocarboxylic acid may be used which is free of other epoxy-reactive groups including hydroxyl and other carboxyl groups. The acids include aliphatic acids containing 2–18 carbon atoms; for example, acetic acid, butyric acid, and caproic acid; drying and semi-drying oil fatty acids including tall oil fatty acids, soya bean oil fatty acids, and the like; rosin acids including abietic acid, rosin, and the like; aromatic acids including benzoic acid, chlorobenzoic acid, alkylbenzoic acid, and the like. Mixtures of such acids may be used.

When allo-ocimene diepoxide and monohydric alcohol are reacted (chemically combined) in equal molar amounts, the four isomers have the configurations of isomers V, VI, VII, and VIII and may be represented by the general formula:

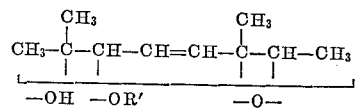

wherein R' is the residue of a monohydric aliphatic, alicyclic, or aromatic alcohol. The monohydric alcohols which may be used include methanol, isobutyl alcohol, tert.-butyl alcohol, isooctyl alcohol, octadecanol, cyclohexanol, phenol, and mixtures thereof.

The relative proportions of reactants and the reaction conditions may be varied. A stoichiometric excess of either allo-ocimene diepoxide or an excess of acid or alcohol may be used. When diesters are to be formed, it is preferable to charge a stoichiometric excess, more than 2 moles, of acid to the reaction vessel to increase the yield based on the amount of diepoxide charged; however, as little as 1.5 moles of acid may be used although some monoester will be produced. When monoesters are to be produced, the acid and allo-ocimene diepoxide preferably are charged to the reaction vessel in about equal molal amounts. An excess of acid tends to cause the formation of some diesters. If there is an excess of allo-ocimene diepoxide, the yield based on the amount of diepoxide charged is reduced; however, as little as 0.5 mole of acid per mole of diepoxide may be used. Particularly if a mixture of mono- and diesters is desired, the amount of acid may be in the range of from 1 to 2 moles of acid per mole of diepoxide. Similarly, the amount of monohydric alcohol may be in the range of from 0.50 to 1.2 moles of alcohol per mole of allo-ocimene diepoxide although about equal molal amounts are preferred.

The reaction of allo-ocimene diepoxide with either acid or alcohol proceeds at room temperature although somewhat higher temperatures are preferred to shorten the reaction period. When reacting the diepoxide with an aliphatic alcohol an acidic catalyst preferably is used and the catalyst may be any of those customarily used to promote the esterification reaction between alcohols and aliphatic acids. Such catalysts include the strong acids, particularly those containing oxygen, the Lewis acids, and acidic ion exchange resins. Other illustrative acids are $H_2SO_4$, $H_3PO_4$, HCl, $BF_3$, $AlCl_3$, and the like. When phenol is a reactant, a strong basic catalyst, such as sodium or potassium hydroxide, may be used instead of an acidic catalyst.

Example 1

Glacial acetic acid, 66 g. (1.1 mole), was stirred while 84 g. (0.5 mole) of allo-ocimene diepoxide was added dropwise during 30 minutes. A mild exotherm maintained a reaction temperature of about 50° C. After addition was complete, stirring was continued for 1 hour while the temperature dropped to ambient. The reaction mixture was then stirred at 100° C. for 1.5 hours and allowed to stand overnight.

The crude product was examined by infrared to reveal the following bonds: hydroxyl, 2.9μ; carbonyl, 5.8μ; trans-alkene, 10.3μ. Epoxide groups at 11.5 and 12.5μ were absent. This crude product contained 2,3,6,7-(dihydroxy diacetoxy)-2,6-dimethyloctene-4.

Example 2

Allo-ocimene diepoxide, 84 g. (0.5 mole), was stirred and 30 g. (0.5 mole) of glacial acetic acid was added in one portion. An exotherm raised the temperature to 60° C. within about ten minutes, and this temperature was maintained for 30 minutes by intermittent use of a cooling bath. Stirring was continued for 1.5 hours while the temperature dropped to ambient, and the reaction mixture was allowed to stand overnight.

The light yellow viscous liquid product on infrared analysis showed the presence of the following functional groups: hydroxyl, 2.9μ; ester carbonyl, 5.8μ; trans-alkene, 10.3μ; epoxide, 11.5 and 12.5μ.

Example 3

Allo-ocimene diepoxide, 168 g. (1.0 mole), and 93 g. (0.8 mole) of caproic acid were mixed and warmed to 80° C. The resulting exothermic reaction was controlled at 90°–100° C. during about 30 minutes, after which time the exotherm seemed to be over. An analytical sample taken at this time showed acid number, 59.5, and saponification number 179.

The mixture was heated to 100°–110° C. with stirring for six hours and allowed to stand overnight. The final crude product showed: acid number, 8.7; saponification number, 174.5; infrared carbonyl absorption at 5.8μ; epoxide absorption bonds of 11.4 and 12.35μ.

The cured product was pot distilled under vacuum to give: (1) 24 g. heads; (2) 174 g., boiling range 110°–180° C. (<1 mm.); and (3) residue. Cut (2) showed: acid number, 17; saponification number, 190. The infrared curve was quite similar to that of the crude product. The crude product contained a mixture of the mono- and diesters.

Example 4

A mixture of 168 g. (1.0 mole) of allo-ocimene diepoxide and 186 g. (1.6 moles) of caproic acid was stirred for two hours. A mild exotherm raised the temperature to a maximum of 44° C. during the first hour. The acid value at the end of one hour was 177. The system was allowed to stand overnight (acid number, 130).

The reaction mixture was stirred at 100°–110° C. for four hours (acid number, 52). After two additional hours reaction at this temperature, the mixture showed: acid number, 50; saponification number, 256.

The crude product was stripped at <1 mm. and a maximum pot temperature of 170° C. to give 42 g. of heads. The residual stripped material showed: acid number, 3.3; saponification number, 236 (theoretical value for a bis-hydroxyester, 281). The product was an oily, moderately viscous liquid and was a mixture of esters.

Example 5

A mixture of 200 g. (0.66 mole) of W W wood rosin and 111 g. (0.66 mole) of allo-ocimene diepoxide was heated with stirring at 100° C., and the progress of reaction was followed by acid number determinations (theoretical starting value, 119). After three hours, the acid number was 31.3. Heating was continued for two additional hours at 125°–130° C., acid number 22.1. The reaction mixture was light amber in color, and no evolution of water was observed.

The crude reaction product was vacuum stripped at <1 mm. to a maximum pot temperature of 150° C. Very little volatile material distilled over, and no obvious decomposition of the residue occurred. The vacuum topped product showed: acid number, 21.5; high temperature saponification number, 112; ball and ring melting point, 62° C.

Example 6

A mixture of refined tall oil fatty acids and allo-ocimene diepoxide in 1:1 molar ratio (62.5% free fatty acid) was heated at 50°–75° C. for 3¼ hours and then at 80°–85° C. for 24 hours. At this time the mixture contained 5.3% free fatty acid and the infrared spectrum showed hydroxyl, ester, and possibly epoxide absorption. To this crude product was added a mol of acetic acid, and heating at 80°–85° C. was continued for 27 hours. Titration showed that about half of the acetic acid remained unreacted, and this excess was removed under vacuum. The 0.5 mol of acetic acid which did react, reacted with any unreacted epoxy groups and probably reacted to a slight extent with some of the hydroxyl groups. The residue then had infrared absorption characteristic of hydroxyl, fatty acid ester, and acetic acid ester, while the bonds assigned to epoxide had disappeared.

Example 7

A suspension of 2.0 g. concentrated sulfuric acid catalyst in 200 ml. of benzene was rapidly stirred, while a solution of 16 g. (0.5 mole) of methanol in 84 g. (0.5 mole) of allo-ocimene diepoxide was added dropwise during 1.5 hours. A mild exotherm produced a maximum reaction temperature of 55° C. during this period; the exotherm appeared to be over as soon as the addition was complete. Stirring was continued for an additional hour.

The deep red reaction mixture was neutralized by the addition with stirring of a solution of 5 g. sodium carbonate in 25 ml. of water. The color of the organic phase lightened from deep red to orange. The reaction mixture was washed with 50 ml. of 10% aqueous sodium hydroxide, then with 100 ml. of water.

Benzene was removed by distillation at atmospheric pressure, and the residue was pot distilled to give: 34 g., boiling range 75°–130° C. (5 mm.), orange: yellow liquid.

Example 8

Allo-ocimene diepoxide, 84 g. (0.5 mole), was stirred while 37 g. of tert.-butyl alcohol containing 1% by weight of concentrated sulfuric acid catalyst was added dropwise during one hour. A mild exotherm was easily controlled to maintain a reaction temperature of 40°–45° C. by intermittent use of a cooling bath. After addition was complete, stirring was continued for one hour without further external cooling. During this period, the temperature rose to a maximum of 50° C., then subsided.

The reaction mixture was diluted with 50 ml. of benzene and washed with 50 ml. of 10% aqueous sodium carbonate. Layers were separated, and solvent was removed from the organic layer by distillation to a pot temperature of 110° C. The residue was a light yellow, mobile liquid; yield, 104 g. (86% weight yield).

A 33 g. portion of this material was distilled using a pot still with wide-bore takeoff and an air-cooled condenser to give: (1) 2.5 g., boiling range 93°–110° C. (4 mm.) and (2) 11.0 g., boiling range 100°–150° C. (<1 mm.).

Example 9

A mixture of 168 g. (1.0 mole) of allo-ocimene diepoxide, 74 g. of (1.0 mole) of tert.-butyl alcohol, and 10 g. of an acidic ion exchange resin catalyst was stirred for five hours. A very mild exotherm maintained a reaction temperature of 30°–32° C. The catalyst was removed by vacuum filtration.

The filtered product was pot distilled under line vacuum to give: (1) 40 g., boiling range 90°–120° C. (10 mm.), light yellow liquid; (2) 16 g., boiling range 120°–150° C. (12 mm.), amber liquid; and (3) 90 g., residue, very dark. Decomposition occurred throughout this distillation, as evidenced by color darkening, evolution of water and other volatiles, and tendency for pressure of the system to rise as filtration failed to remove the catalyst.

Example 10

Allo-ocimene diepoxide, 168 g. (1.0 mole), was stirred and 74 g. (1.0 mole) of tert.-butyl alcohol containing 1% by weight of concentrated sulfuric acid was added in portions during 30 minutes. Intermittent cooling with an ice bath was necessary to maintain a reaction temperature of 50° C. ± 5° C. After addition was complete, stirring was continued for one hour without further cooling, the exothermic reaction being over. The reaction mixture was dark amber in color.

A solution of 10 g. of sodium carbonate in 50 ml. of water was added with vigorous stirring. The color of the organic phase changed markedly to light yellow-orange. Benzene, 100 ml., was added with stirring, and the layers were separated.

Attempted removal of the benzene by pot distillation led to darkening and extreme decomposition; apparently, the t-butoxy product of this reaction will not tolerate a temperature much in excess of 100° C.

Example 11

This reaction was run as described in Example 10 except that the product was washed with 100 ml. of 10% sodium hydroxide instead of sodium carbonate.

Layers were separated, and the organic phase was washed three times with brine. (Emulsion formation was troublesome.)

Benzene was removed by distillation from a water bath, first at atmospheric pressure, finally at 10–15 mm. line vacuum. Maximum pot temperature was 90° C. There remained an amber-colored liquid residue, 182 g. (75.3% weight yield).

Analytical: molecular weight, 410 (theoretical, 242); hydroxyl, 1.32, 1.27 meq./g. (theoretical, 4.13); oxirane content, 1.29, 1.25% (theoretical, 6.62%). Infrared examination showed the absence of the trans-epoxide band at 11.5μ; the cis-epoxide band at 12.3μ was present.

Example 12

Toluene, 100 ml., containing 10 drops of concentrated sulfuric acid was stirred, and a solution of 37 g. (0.5 mole) of tert.-butyl alcohol in 84 g. (0.5 mole) of allo-ocimene diepoxide was added dropwise during 1.5 hours. A mild exotherm occurred; the reaction temperature was easily controlled at 25°–30° C. by intermittent cooling. A reddish-brown color developed during this period. Stirring was continued for two hours after addition was completed without external heating or cooling; the temperature held slightly above ambient. Powdered calcium carbonate, 1.0 g., was added with stirring.

Vacuum filtration failed to remove the finely divided solids. The reaction mixture was allowed to settle overnight, after which most of these solids were removed by decantation.

Toluene was removed by distillation at 3 mm. from a water bath at 75° C. Distillation of the pot residue under vacuum gave: (1) 17 g., boiling range 75°–100° C. (5 mm.), light yellow oil; and (2) 22 g., boiling range 100°–195° C. (2 mm.), reddish-orange oil, with decomposition and evolution of volatiles.

Example 13

Phenol, 47 g. (0.5 mole), was melted, and 0.5 g. of potassium hydroxide was added. Allo-ocimene diepoxide, 84 g. (0.5 mole), was added and the system was heated at 100° C. with stirring for 5 hours, then allowed to stand overnight. The resulting system was a dark reddish-brown, fairly viscous liquid, apparently homogeneous.

A 29 g. portion of the reaction product was distilled from a micro pot still to give: (1) 9.0 g., boiling range 90°–100° C. (8 mm.); (2) 2.5 g., boiling range 100°–150° C. (7 mm.); and (3) 17.5 g., residue.

The residue was quite dark in color, tacky, semi-solid; it could not be distilled without decomposition. Fraction (1) gave only a very faint ferric chloride color test, indicating that reaction of phenol with the allo-ocimene diepoxide had been fairly complete.

Example 14

A mixture of 186 g. (1.1 mole) of allo-ocimene diepoxide, 94 g. (1.0 mole) of phenol, and 10 g. of an acidic ion exchange resin catalyst was stirred for 2 hours without exotherm or other evidence of reaction. The temperature of the system was raised to 110°–120° C., and stirring was continued for two hours. Considerable color darkening occurred during this period.

The system was allowed to cool, vacuum filtered to remove the acidic ion exchange resin and pot distilled to give: (1) 78.5 g., boiling range, 80°–110° C. (8 mm.); (2) 29.0 g., boiling range 110°–150° C. (10 mm.); (3) 12 g., boiling range 110°–160° C. (2 mm.); and (4) 105 g., residue, very dark, soft resin. Decomposition was evident throughout the distillation, becoming more pronounced as distillation progressed and pot temperature rose.

Example 15

A solution of 84 g. (0.5 mole) of allo-ocimene diepoxide in 50 ml. of benzene was stirred, and a solution of 47 g. (0.5 mole) of phenol and 0.5 g. of concentrated sulfuric acid in 50 ml. of benzene was added dropwise during a period of one hour. The reaction was exothermic; intermittent use of an ice bath maintained a reaction temperature of 50°–60° C. The addition of each drop of phenol solution produced an intense red localized color which rapidly disappeared in the stirred solution. The color of the reaction mixture was light yellow at first, changing to dark red toward the end of the addition period. Stirring was continued for 30 minutes after the addition was complete, the exotherm being apparently over. Acid was neutralized by the addition of 100 ml. of 10% aqueous sodium hydroxide with stirring; the color of the solution changed from dark red to light lemon yellow. The system was allowed to stand overnight and separate into layers.

The layers were separated and the organic layer was washed thrice with brine. Solvent was removed by distillation from a steam bath, first at atmospheric pressure, finally under partial vacuum. The residue was dark in color, and contained some crystalline material. The bulk of the material, however, remained liquid even on refrigeration.

Pot distillation gave: (1) 40 g., boiling range 80°–110° C. (6 mm.), reddish liquid; (2) 78 g., residue, very dark viscous liquid. The distillate contained much unreacted phenol, as evidenced by formation of crystals in the still head on attempted fractional distillation.

The residue failed to crystallize on prolonged refrigeration. Analytical: molecular weight, 490 (theoretical, 262); hydroxyl, 1.44, 1.49 meq./g. (theoretical, 3.82); oxirane oxygen, 0.60, 0.60% (theoretical, 6.1%). Infrared analysis confirmed the virtual absence of oxirane functionality indicating this product was the diphenoxy derivative.

Example 16

Allo-ocimene diepoxide, 186 g. (1.1 mole), was stirred, and 130 g. (1.0 mole) of isooctanol (mixed isomers) containing 1% by weight of concentrated sulfuric acid was added dropwise during 30 minutes. A fairly vigorous exotherm occurred, and the reaction temperature was maintained at 40°–50° C. by intermittent use of an ice bath. Stirring was continued for one hour after the addition was complete; the exotherm appeared to be over. The reaction mixture was quite viscous and red-orange in color. Acid was neutralized by the addition of 100 ml. of 10% sodium hydroxide with stirring. The color of the organic phase changed from red-orange to light yellow.

Layers were separated, and the organic layer was washed twice with 100 ml. portions of brine. Solvent was removed by distillation from a water bath, first at atmospheric pressure, finally under vacuum (ca. 7 mm.). The residue was a light amber, fairly viscous liquid; yield, 308 g. (97.5 weight percent).

Analytical: molecular weight, 270 (theoretical, 298); hydroxyl, 1.69, 1.61 meq./g. (theoretical, 3.35); oxirane oxygen, 0.22, 0.25% (theoretical, 5.4%).

A sample of the crude product above was stripped in a micro pot still of all material distilling at a maximum pot temperature of 115° C. (<1 mm.). The residue showed:

Analytical: molecular weight, 430 (theoretical, 298); hydroxyl, 1.44, 1.32 meq./g. (theoretical, 3.35); oxirane oxygen (dioxane-HCl method), 2.8, 3.1% (theoretical, 5.4%). Infrared evidence was inconclusive as to the presence of oxirane oxygen.

Example 17

A solution of 42 g. (0.25 mole) of allo-ocimene diepoxide in 50 ml. of benzene was stirred, and a solution of 68 g. (0.25 mole) of octadecyl alcohol and 0.68 g. of concentrated sulfuric acid in 100 ml. of benzene (warm, to keep in solution) was added dropwise during 30 minutes. A mild exotherm maintained a reaction temperature of 50°–60° C. in the early stages, diminishing toward the end of the addition period. Stirring was continued for one hour after addition was complete. The reaction mixture was brought briefly to reflux, then allowed to cool and stand overnight.

The system was washed with two 100 ml. portions of brine, and the solvent benzene was removed by distillation from a water bath. The residue crystallized on cooling. A small sample of the crystalline material, recrystallized from benzene, showed melting point 58° C., thus identifying it as unreacted octadecyl alcohol.

Example 18

Allo-ocimene diepoxide, 168 g. (1.0 mole), was stirred, and 100 g. (1.0 mole) of cyclohexanol containing 1.0 g. of concentrated sulfuric acid was added dropwise during 30 minutes. A fairly vigorous exotherm necessitated intermittent use of an ice bath to maintain a reaction temperature of 40°–50° C. The reaction mixture became quite viscous, and a dark amber color developed toward the end of the addition period. Stirring was continued for 30 minutes after addition was complete, at which time the exothermic reaction appeared to be completely over. The viscous reaction mixture was diluted with 100 ml. of benzene, and 100 ml. of 20% aqueous sodium carbonate was added with stirring. Color of the organic phase changed from dark amber to light yellow. Layers were separated, and the organic phase was washed with three 100 ml. portions of water. Emulsion formation was quite troublesome.

The benzene solvent was removed by distillation from a water bath; a second 100 ml. portion of benzene was added to it and distilled off. The residue still gave the appearance of being quite wet. This residue, without further attempt to dry, was distilled from a pot still at 7 mm. pressure. After removal of water, there was obtained 40 g. of distillate, boiling range 65°–85° C. The residue, 208 g., was light amber in color and quite viscous.

Analytical: molecular weight, 640 (theoretical, 268); hydroxyl, 1.39, 1.32 meq./g. (theoretical, 3.73); oxirane oxygen, 0.67, 0.70% (theoretical, 5.96%). Infrared analysis confirmed the absence of appreciable amounts of oxirane oxygen.

Example 19

A mixture of 168 g. (1.0 mole) of redistilled allo-ocimene diepoxide, 100 g. (1.0 mole) of cyclohexanol, and 10 g. of an acidic ion exchange resin catalyst was stirred at room temperature for a total reaction period of 24 hours. No exotherm was observed.

Reaction was followed by infrared analysis, absorption curves being observed at 0, 6, and 24 hours reaction time. The major change observed was a broadening and coalescence of ether bands at 9.0 and 9.4$\mu$. Epoxide bands at 11.3 and 12.3$\mu$ were not very sharp, even in the original mixture, and were of little utility for following the reaction.

The acidic ion exchange resin was removed by vacuum filtration, and the liquid reaction product was taken up in 300 ml. of diisopropyl ether, a portion of the ether being used to wash the acidic ion exchange resin on the filter and rinse the reaction flask. The ether solution of product was washed with two 100 ml. portions of 10% aqueous sodium hydroxide and with 100 ml. of water.

Solvent ether was removed by distillation at atmospheric pressure, and the residue was pot distilled at full oil pump vacuum (<1 mm.) to give: (1) 59 g. heads, boiling range 45°–70° C.; (2) 30 g., light yellow viscous liquid, boiling range 70°–120° C.; (3) 84 g., very viscous, light yellow liquid, boiling range 120°–155° C.; (4) 17 g., lemon yellow, very viscous liquid, boiling range 155°–190° C.; and (5) 52 g., residue, medium amber, soft resin.

Oxirane analysis of Cut (3) by the dioxane-HCl method showed 8.61, 7.74, 7.63% oxirane oxygen.

In at least some of the foregoing reactions involving monohydric alcohols, the high molecular weights indicate that at times there is possibly some cross-linking (formation of polymers), possibly through the hydroxyl groups.

The present reaction products may be used for many purposes. The reaction products of allo-ocimene diepoxide and monocarboxylic acids may be reacted with dicarboxylic acids through the hydroxyl group to form polyester resins. The reaction products of allo-ocimene diepoxide and monohydric alcohol also may be reacted with polycarboxylic acids to form polyesters or may be used as emulsifying agents in the formation of water-in-oil emulsions.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A composition comprising at least one compound selected from the group consisting of esters having the general formula

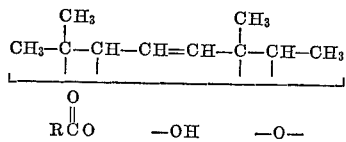

and the esters having the general formula

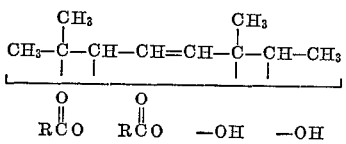

wherein, in each instance, R is the residue of an acid after removal of the carboxyl group selected from the group consisting of monocarboxylic aliphatic acids, rosin acids, monocarboxylic acids of the benzene series, and mixtures thereof, all of said acids being free of other epoxy-reactive groups.

2. A composition as claimed in claim 1 in which said acid is acetic acid.

3. A composition as claimed in claim 1 in which said acid is a caproic acid.

4. A composition as claimed in claim 1 in which said acid is rosin acids.

5. A composition as claimed in claim 1 in which said acid is drying oil fatty acid.

6. A composition as claimed in claim 1 in which said acid is tall oil fatty acids.

7. The process of producing esters comprising reacting allo-ocimene diepoxide with from 1 to 2 moles of a monocarboxylic acid free of other epoxy-reactive groups and selected from the group consisting of monocarboxylic aliphatic acids, rosin acids, monocarboxylic aromatic acids of the benzene series, and mixtures thereof.

8. The process of producing esters as claimed in claim 7 in which said acid is acetic acid.

9. The process of producing esters as claimed in claim 7 in which said acid is caproic acid.

10. The process of producing esters as claimed in claim 7 in which said acid is rosin acids.

11. The process of producing esters as claimed in claim 7 in which said acid is drying oil fatty acid.

12. The process of producing esters as claimed in claim 7 in which said acid is tall oil fatty acids.

References Cited

UNITED STATES PATENTS 3,073,786   1/1963   Kraft et al. _____ 260—2

HOSEA E. TAYLOR, Jr., *Primary Examiner.*

WILLIAM E. PARKER, *Assistant Examiner.*